(12) United States Patent
Dobusch et al.

(10) Patent No.: US 6,850,276 B1
(45) Date of Patent: Feb. 1, 2005

(54) METHOD FOR DETECTING BRIGHTNESS SIGNALS FROM A MULTIPLICITY OF LIGHT-SENSITIVE SENSOR ELEMENTS

(75) Inventors: Armin Dobusch, Ingolstadt (DE); Holger Jordan, Ingolstadt (DE); Wolfgang Schmid, Brunnen (DE); Armin Steiner, Ingolstadt (DE)

(73) Assignee: Conti Temic microelectronic GmbH, Nürnberg (DE)

(*) Notice: Subject to any disclaimer, the term of this patent is extended or adjusted under 35 U.S.C. 154(b) by 975 days.

(21) Appl. No.: 09/616,553

(22) Filed: Jul. 14, 2000

(30) Foreign Application Priority Data

Jul. 15, 1999 (DE) .......................................... 199 33 199

(51) Int. Cl.⁷ ........................ H04N 5/228; H04N 5/235; H04N 5/20; H03M 1/62; H03M 1/84
(52) U.S. Cl. ................. 348/255; 348/222.1; 348/229.1; 348/230.1; 348/300; 341/139; 341/155
(58) Field of Search ............................... 348/300, 229.1, 348/255, 678, 230.1, 222.1; 341/155, 139

(56) References Cited

U.S. PATENT DOCUMENTS

| | | | | |
|---|---|---|---|---|
| 4,540,974 A | * | 9/1985 | Schanne et al. | 341/118 |
| 4,831,378 A | * | 5/1989 | Baars et al. | 341/139 |
| 5,402,249 A | * | 3/1995 | Koseki et al. | 358/446 |
| 5,712,682 A | * | 1/1998 | Hannah | 348/255 |
| 5,818,528 A | * | 10/1998 | Roth et al. | 348/364 |
| 6,002,445 A | * | 12/1999 | Urayama | 348/572 |
| 6,137,533 A | * | 10/2000 | Azim | 348/222.1 |
| 6,195,133 B1 | * | 2/2001 | Bae | 348/678 |
| 6,275,259 B1 | * | 8/2001 | Gowda et al. | 348/229.1 |
| 6,421,086 B1 | * | 7/2002 | Kuno et al. | 348/312 |
| 6,707,492 B1 | * | 3/2004 | Itani | 348/229.1 |

FOREIGN PATENT DOCUMENTS

| | | | | |
|---|---|---|---|---|
| DE | 4228299 A1 | * | 3/1994 | G01J/1/42 |
| DE | 197 04 793 A1 | | 2/1997 | |
| EP | 0 150 847 B2 | | 1/1985 | |

* cited by examiner

*Primary Examiner*—Andrew Christensen
*Assistant Examiner*—Brian Genco
(74) *Attorney, Agent, or Firm*—Venable LLP; Robert Kinberg

(57) ABSTRACT

A method is described for detecting brightness signals from a multiplicity of light-sensitive sensor elements, in particular CCD lines or arrays, in which the brightness signals are amplified in such a way that an A/D converter which digitizes the amplified brightness signals works in its permissible working range. For the brightness signal of a predetermined sensor element, the gain is reduced in steps, preferably in binary steps, from a maximum gain factor down to a working value at which the A/D converter works in the permissible working range. For each following sensor element, the working value of the respective preceding sensor element is used as the maximum gain factor. The number of changeover operations of the amplifier is considerably reduced and thus the detection time is shortened.

7 Claims, 2 Drawing Sheets

METHOD FOR DETECTING BRIGHTNESS SIGNALS FROM A MULTIPLICITY OF LIGHT-SENSITIVE SENSOR ELEMENTS

BACKGROUND OF THE INVENTION

This invention relates to a method for detecting brightness signals from a multiplicity of light-sensitive sensor elements, in particular from CCD lines or arrays.

DE 42 28 299 A1, for example, describes as state of the art in column 1 starting in line 40 a method of this kind in which the brightness signals are amplified in such a way that an A/D converter which digitizes the amplified brightness signals works in its permissible working range. A method of this kind is also referred to there as signal conditioning. Resetting of the amplifier results here in a slowing down of the measurement because of the operating delay in the amplifier. In order to be able to image on the working range of the A/D converter the entire dynamic range of the brightness signal, that is both the lower and the upper limit of the brightness signal, the gain factor is preferably corrected pixel by pixel. In particular when correcting the gain factor pixel by pixel, each pixel must be reset on the basis of a maximum or minimum gain factor.

Furthermore, DE 197 04 793 A1 also describes an optical transmission and receiving device in which optical guiding means are provided within the housing in front of a translucent cover between transmission unit and receiving unit so that the light component reflected at the translucent cover of the transmission device is guided to the receiving unit, thereby making it possible to establish that the transmission unit is functioning and whether the translucent cover is dirty.

Moreover, from EP 0 150 847 B2 a lighting control equipment is known for facsimile devices, scanners, photocopying machines or other similar optical equipment with an optical transmission and receiving system, where the lighting time of the light source of the transmitter is adjusted according to the brightness received at the receiver.

SUMMARY OF THE INVENTION

A method for detecting brightness signals from a multiplicity of light-sensitive sensor elements, in particular from CCD lines or arrays, according to this invention adjusts the gain factor for a first sensor element by reducing step by step from a maximum gain factor down to a working value at which the A/D converter operates in the permissible working range and then selects only the gain factor of the respective preceding measurement as a starting point, in other words at most to further reduce the gain factor should the brightness signal with the previous gain factor indeed be beyond the working range of the A/D converter. By using the respective preceding gain factor and consequently by avoiding the need to again increase the gain factor, acquisition of the measured value becomes considerably faster because changeovers occur less frequently. For any following weaker brightness signals, the measured-value acquisition becomes somewhat less accurate because the resolution of the A/D-converted signal in the low brightness range is coarser, but for many applications this is negligible. The binary grading of the gain factor is of particular advantage because this allows immediate linkage of the gain factor with the A/D-converted signal to an item of brightness information.

Especially when using the method for the determination of the location of a brightness maximum from the center of gravity weighted with the brightness information where the brightness is distributed in bell-shaped form about this brightness maximum, the inaccuracy in acquiring the measured value for a brightness signal that is again diminishing is negligible because these measured values also have a lesser effect on the determination of the center of gravity.

BRIEF DESCRIPTION OF THE DRAWINGS

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

DESCRIPTION OF THE PREFERRED EMBODIMENTS

Figure 1:
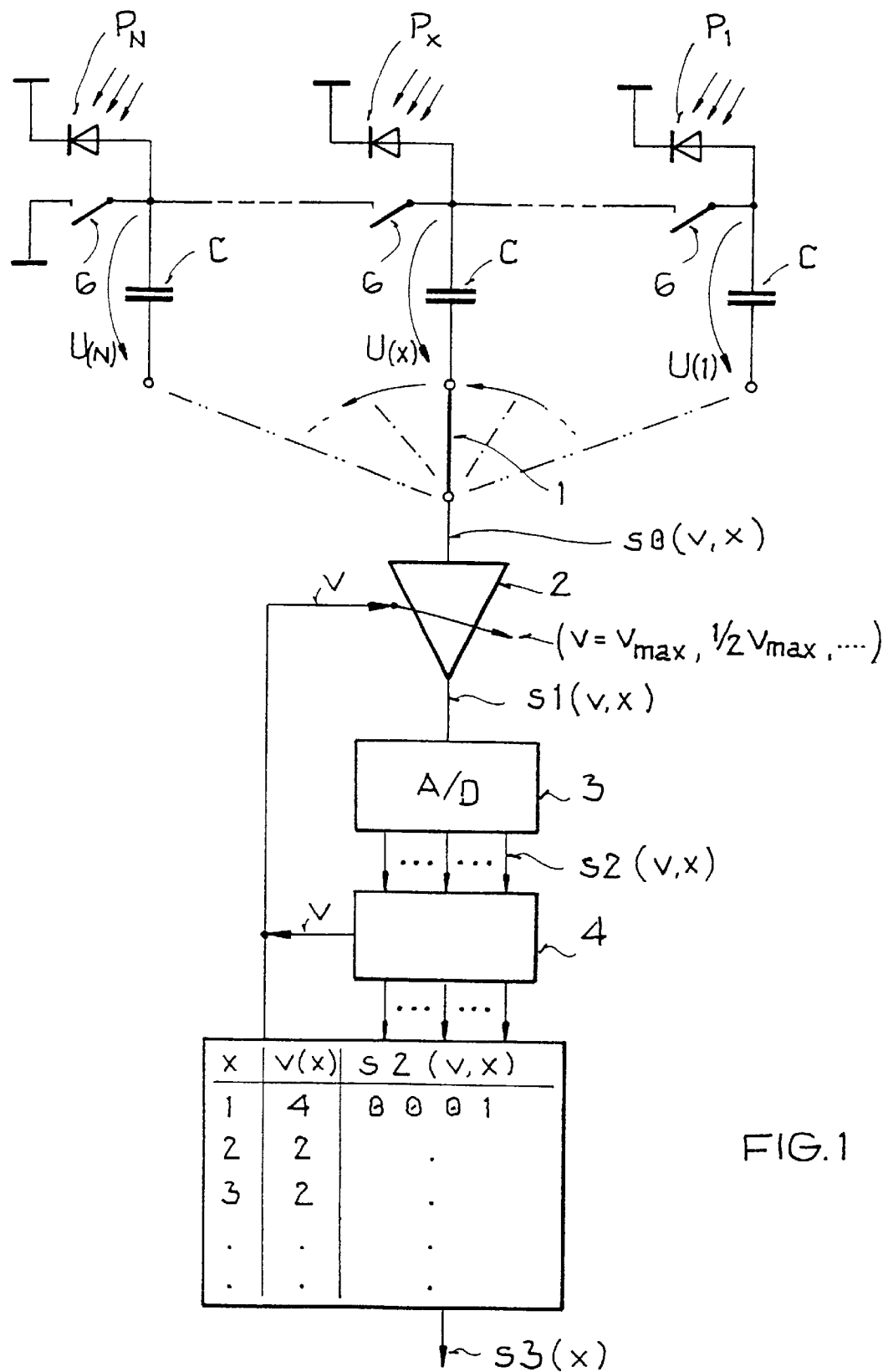
FIG. 1 shows a detection system with an A/D converter and gain adjustable in steps in which the method of this invention is used.

FIG. 1 shows a detection system for detecting brightness signals U(x) from a multiplicity (x:=1 . . . n) of light-sensitive sensor elements P(l). . . P(x). . . P(n), in particular of a CCD line. After the charge capacitors C have been reset to ground by means of switches 6, these charge capacitors are charged with the released charge carriers in the sensor elements P(x) for a given period of time in accordance with the brightness. The brightness signals SO(x) of the individual sensor elements P(x) are read out in this process one after the other which is made clear in this embodiment in simplified form by the switch 1. The brightness signal s0(x) is fed here to an adjustable amplifier 2 with a known quantity of gain factors, preferably in binary steps. The brightness signal sl(x,v) at the output of the amplifier 2, amplified by the gain factor v, is then fed to an A/D converter 3 which generates from it a digital brightness signal with an appropriate limited number of bits. The control unit 4 checks whether it is evident from the digital brightness signal s2(x,v) that the amplified brightness signal sl(x,v) is already beyond the working range of the A/D converter 3. This can be identified by setting all bits of the brightness signal s2(x,v) or a carryover bit to logical "1".

The gain is reduced in steps from a maximum gain factor v down to a working value v(x) at which the A/D converter 3 operates in the permissible working range. The brightness signal s2(x,v) which is then present is then transferred to an evaluator 5, the working value v(x) of the gain also being allowed for. The working value v(x) can be stored for each sensor element P(x). Or those sensor elements P(x) with a downgrading of the gain factor are registered or when storing the brightness signal s2(x,v) is linked directly with the working value v(x) as will be explained in more detail with reference to FIG. 4.

Figure 2:
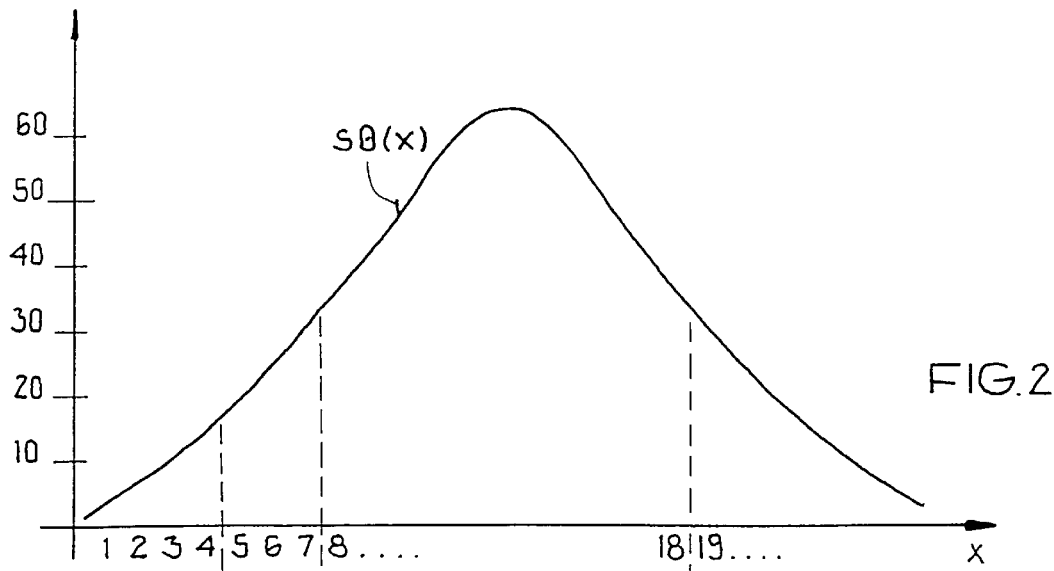
FIG. 2 shows a brightness signal from the sensor elements of the detection system of FIG. 1 and distribution over the pixels.

For all other following sensor elements, the working value of the respective preceding sensor element is used as maximum gain factor and this is reduced if need be when the brightness signal sl(x,v) is beyond the working range of the A/D converter 3. At the output of the evaluator 5, brightness information s3(x) corrected according to the gain factor can be read out and from this the location of the brightness information maximum, for example, can be calculated with the center of gravity weighted with the brightness information. With a bell-shaped distribution of the brightness, for example a Gaussian or normal distribution about this brightness maximum as sketched in FIG. 2, the error arising due to the gain factor v not being increased again will be negligible.

Figure 3:
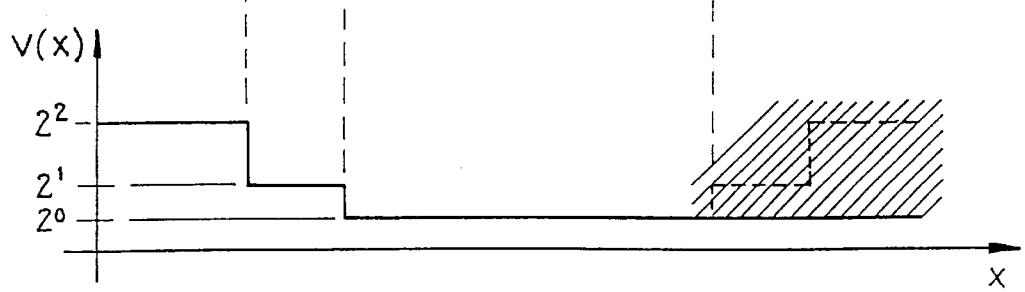
FIG. 3, shows reduction of gain with increasing brightness signal from the sensor elements of the detection system shown in FIG. 1 in three steps.

The variation of the gain factor v is shown in FIG. 3. First of all, the diminishment of the gain factor v with increasing brightness can be seen clearly, but it must be emphasized here that for the detection of an x-th sensor element P(x) the working value of the gain v(x-1) of the preceding sensor element P(x-1) is used so that for a majority of the measurements the gain need not be changed over at all because the brightness signal initially amplified by the old working value exceeds the working range of the A/D converter 3 only at pixels 05 and 08. It is indicated here in dashed lines when the gain factor could conceivably be increased, although not actually done so in this method, in order to save further changeover operations and the associated changeover delay of the amplifier 2.

Figure 4:
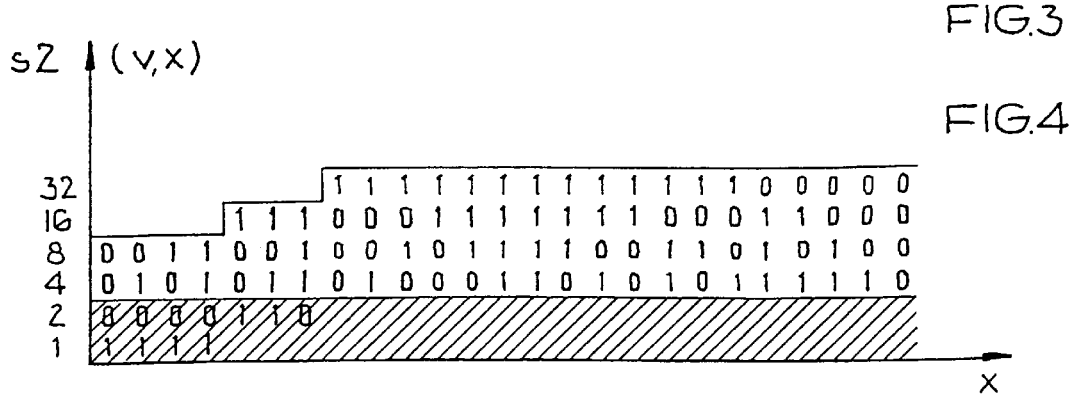
FIG. 4 shows the A/D-converted brightness signal in the detection system of FIG. 1 with 4 bits, with allowance made for the gain factor for the purpose of illustration.

The effect of adjusting the gain v to the brightness signal so(x) and the working range of the A/D converter 3 can be seen particularly clearly from FIG. 4 where the amplified and A/D-converted brightness signal s2(v,x) is shown with 4 bits, the gain factor having being allowed for by way of illustration. The 4 bits, for example, of the A/D converter 3 are virtually extended to 6 bits through the three steps of the gain v, where for small brightness signals s0(x) the maximum possible gain is still active in the first pixels 01 to 04 and leads to a relatively accurate resolution. With pixel 05, the gain must be reduced because prior to this the amplified brightness signal sl led to a value beyond the working range. This can be readily seen from the 4 bits of the brightness signal s2 that are set to a one step higher significance. The least significant of the virtual 6 bits is neglected here as quantizing error. In pixel 08, the gain must be reduced again by one step, and consequently the range detected by the 4 bits of the A/D converter shifts to the 4 most significant bits of the virtual 6 bits and the two least significant are neglected.

Consequently, the gain need not be specified before beginning to detect the pixels and need not be set to the lowest working value of all pixels. Even if the brightness signal s0(x) has exceeded the maximum and becomes noticeably smaller, the gain is still not increased, although this would in principle be conceivable as from pixel 19 for example, because the most significant bit is now zero. It is true that this means that the brightness signal is no longer resolved with the same accuracy, but the brightness information remains sufficiently accurate compared with that in the maximum.

In order to normalize all digital brightness signals s2(x,v) with the gain factor v, the non-detected virtual bits in FIG. 4 could be filled correspondingly with zeros, although a larger controller would be required for this shifting of the 4 real bits within the dynamic range of 6 bits. As an alternative, all brightness signals s2(x,v) could be normalized to the lowest gain v, i.e. in this case the two least significant bits could be cancelled.

Although the invention has been described in detail with reference to certain preferred embodiments and specific examples, variations and modification exist within the scope and spirit of the invention as described and as defined in the following claims.

What is claimed is:

1. A method for detecting brightness signals from a multiplicity of light-sensitive sensor elements where the brightness signals are amplified and then digitized by an analog to digital (A/D) converter, comprising the steps of:

(a) reducing the gain at which a brightness signal of a first one of the sensor elements is amplified in steps from a maximum gain factor down to a working value at which the A/D converter works in a permissible working range;

(b) using the working value as the maximum gain factor for the gain at which the brightness signal of a next one of the sensor elements is amplified; and (c) repeating steps (a) and (b) for the brightness signals of the rest of the sensor elements.

2. The method according to claim 1, wherein the step of reducing the gain comprises reducing it in binary steps.

3. The method according to claim 1 wherein the sensor elements are part of a CCD line and the brightness signals of the sensor elements are digitized by the A/D converter according to their sequence in the CCD line beginning with an outermost one of the sensor elements.

4. The method according to claim 1 wherein brightness information for each brightness signal is derived from the digitized value of the corresponding amplified brightness signal and from the working value of the gain used to amplify that brightness signal.

5. The method according to claim 4 and further including the step of determining the location of a brightness maximum from a center of gravity weighted with the brightness information, with a bell-shaped distribution of the brightness about this brightness maximum.

6. The method according to claim 1 wherein the sensor elements are part of a CCD line.

7. The method according to claim 1 wherein the sensor elements are part of a CCD array.

* * * * *